Figure 1:
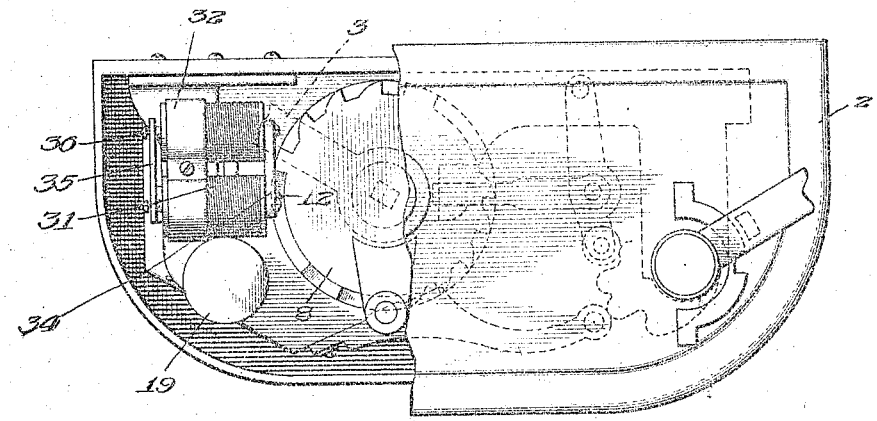

No. 821,768. PATENTED MAY 29, 1906.
J. V. E. TITUS.
CONTROLLER REGULATOR.
APPLICATION FILED APR. 11, 1904.

2 SHEETS—SHEET 1.

No. 821,768. PATENTED MAY 29, 1906.
J. V. E. TITUS.
CONTROLLER REGULATOR.
APPLICATION FILED APR. 11, 1904.
2 SHEETS—SHEET 2.
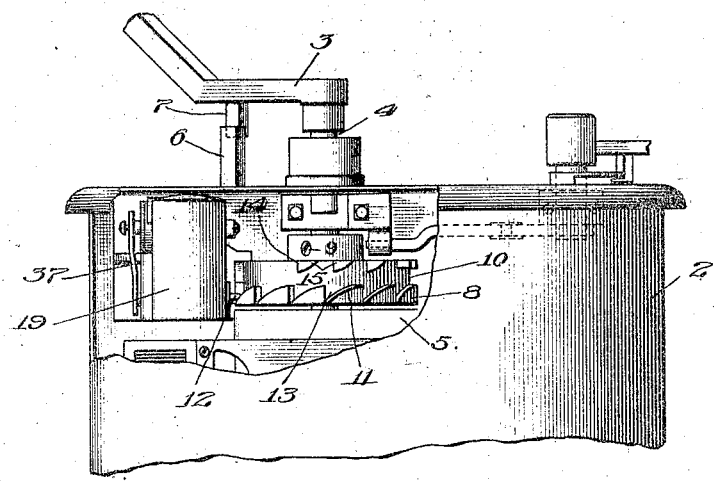
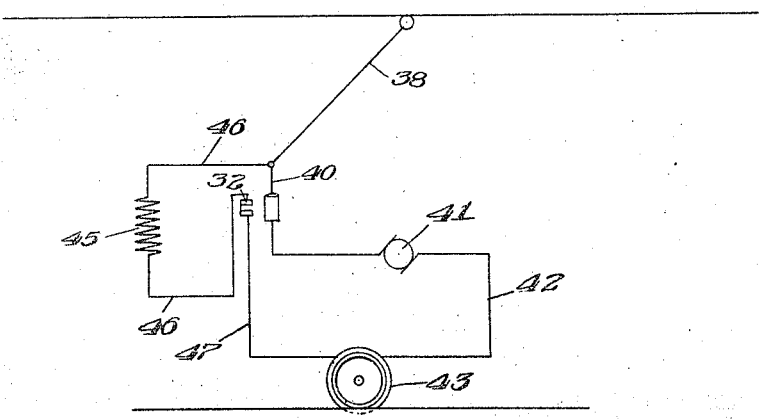

UNITED STATES PATENT OFFICE.

JOSEPH V. E. TITUS, OF KEOKUK, IOWA, ASSIGNOR TO ELECTRICAL DEVICES COMPANY, OF KEOKUK, IOWA, A CORPORATION.

CONTROLLER-REGULATOR.

No. 821,768.     Specification of Letters Patent.     Patented May 29, 1906.

Application filed April 11, 1904. Serial No. 202,618.

*To all whom it may concern:*

Be it known that I, JOSEPH V. E. TITUS, a citizen of the United States, residing at Keokuk, in the county of Lee and State of Iowa, have invented new and useful Improvements in Controller-Regulators, of which the following is a full, clear, concise, and exact description, reference being had to the accompanying drawings, forming a part of this specification.

My invention relates to improvements in that class of controller-regulators which are used on street-car controllers or in analogous relations for preventing the motorman from operating the controller to cut out the resistance in the armature-circuit of the motor or motors too rapidly, to thereby prevent an excess flow of current and the attending waste of energy, and to avoid injury to the apparatus.

It has for its object to provide means whereby in instances where the current is cut off and it is desired to turn the controller rapidly the means for preventing the rapid turning of the controller may be thrown out of operation to permit the turning of the controller as rapidly as desired. This feature is especially desirable in instances where the car is going downhill and for some reason the brake refuses to act, the trolley at the same time jumping the wire. When such an accident occurs, by turning the controller and connecting the motors in multiple one motor will act as a generator, thereby retarding the movement of the car and stopping the same. In the present controllers, in which means are provided to prevent the too rapid operation of the controller, this cannot be accomplished, due to the fact that when the controller is moved so slowly the motors will not be properly connected, and it is one of the objects of this invention to provide means which will when the current is for any reason cut off from the car automatically move out of operation the retarding device and permit the controller to be moved as rapidly as desired.

I have illustrated my invention in the accompanying drawings in connection with one form of controller-regulator; but it will be understood that my invention is equally applicable to other forms.

The same reference characters indicate like parts throughout the several views.

Figure 2:
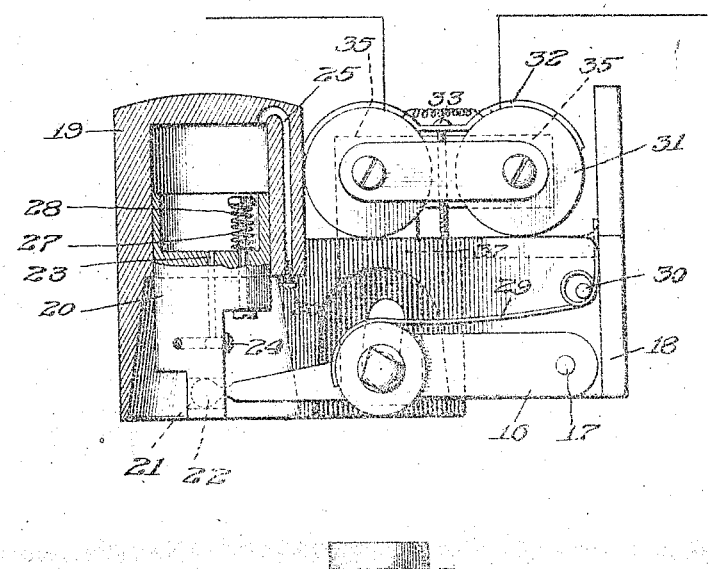

Figure 1 is a plan view of a controller with a regulator embodying my invention attached thereto. Fig. 2 is a side elevation of the pivoted dog with its controller dash-pot. Fig. 3 is a side elevation of the controller, part of the casing being cut away; and Fig. 4 is a diagrammatic view showing the circuit arrangement.

In this one form of regulator in connection with which my invention is used the numeral 2 represents the usual casing of a street-car controller, 3 being the handle or crank of the same, which is carried upon the upper end of the shaft 4 of the controller 5, all in the usual manner. The normal stop 6 is mounted upon the cover of the casing, against which the usual stop 7, carried upon the handle 3, engages when the handle is in off position.

The usual marking-lugs are mounted upon the top of the casing, which indicate the amount of resistance cut out of the circuit as the handle is turned, and the ordinary reversing and interlocking mechanism, as indicated at the right of Fig. 1, all of which may be the usual or desired type and are not specifically described, as they form no part of the controller-regulator.

A wheel or disk 8 is secured to the controller-shaft 4 by set-screws 9, passing through its hub and engaging flattened portions on the shaft and is provided at its periphery with a zigzag channel, slot, or groove 10, having, preferably, the form shown, in which the portions 11 of the lower edge of the slot form inclined cam-surfaces, up which the dog 12 slides as the wheel 8 is rotated in the operation of the handle 3, said cam-portion surfaces being connected by substantially vertical portions 13. The upper edge of the zigzag slot has the stop or ratchet portions 14, against which the dog 12 strikes in the rotation of the wheel 8, said stop portions being connected by the inclined parts 15, which limit the possible upward movement of said dog and confine it within the groove 10. These cam and stop surfaces occur at short intervals throughout portions of the periphery and at longer intervals at others, so that the proper movement of the controller may take place. Any arrangement, however, of these stops and inclined surfaces may occur so that the desired operation of the controller may be secured.

The dog 12 is mounted to reciprocate in a bore provided in an enlargement formed midway between the ends of the lever 16, pivoted at 17 to a casting 18, forming a frame or support for the lever 16 and its coöperating parts and secured by suitable screws or bolts passing through apertures thereof to the flat face or wall of the casing 2. A pin in the rear end of the dog 12 works in a slot in the end of said enlargement and serves to prevent the rotation of the dog, as well as to limit its outward movement.

The end of the dog has its upper and lower edges beveled to correspond somewhat to the slope of the inclined portions of the slot 10 in the wheel 8. The front of the dog is inclined slightly to agree with the stop portions 14 of the upper edge of the slot, which are substantially normal to the inclined portions of the slot, although they may be disposed at any desired angle, but preferably at an angle less than the angle of friction. The stop portions 14 are placed far enough back of the vertical portions of the lower edge to permit the dog to readily drop when the pressure is relieved upon the handle of the controller. When the controller-handle is turned, the dog follows in the groove, sliding up the inclined portions and if the movement of the handle is rapid striking against the stops 14, but dropping again as soon as the pressure is removed from the handle 3, and thus permitting the further rotation of the handle, wheel, and controller.

The dog 12 is rounded off at its reverse edge, so that when the handle is returned to its normal position and the wheel is reversely rotated the curved part will cause the dog to slide back out of the groove 10, thus permitting a ready and quick return of the handle to normal position.

In order that the action of the dog in its vertical movement may be properly governed and made positive, a dash-pot is provided, the cylinder 19 for which is formed at the outer end of the casting 18. A closely-fitting piston 20 for the cylinder is provided with a transverse aperture 21, in which the rounded end 22 of the dog-lever 16 projects. The piston 20 is furnished with a port or passage 23, which may be manually adjusted to the right size by a screw 24, while a similar passage 25 and a screw 26 are provided in the walls of the cylinder. A flat-headed bolt 27 passes through an aperture in the wall of the piston and is furnished with a spring 28 to maintain the aperture closed. This valve may be manually operated to permit the ready manipulation of the piston.

A spring 29 is carried upon a pin 30 of the casing 18 and bears at its inner end against the flange of the casing and at its outer end against the enlargement of the lever 16, whereby downward pressure is exerted upon the lever.

The parts thus far described form no part of my invention and are described for the purpose of showing how my invention may be applied in practice.

For normally holding the dog in operative position a magnet 31 is mounted upon the casting 18 and is secured in position by a cross-piece 32, held in engagement with the upper portion of said magnet by a screw 33. The two cores of the magnet are secured together at their forward ends by a cross-piece 34, secured to the cores of the magnet. The armature member 35 of the magnet is mounted upon the opposite side thereof and loosely held in position by screws 36, passing through openings therein and entering the cores of the magnet. A downwardly-projecting arm 37, formed on the armature member, bears against the rear end of the dog 12 and when the magnet is energized serves to normally force the dog forward into a position where it will engage the cams and stops as the controller is rotated.

When the handle of the controller is rotated in the "on" direction, the end 22 of the lever raises the piston of the dash-pot until the dog 12 strikes the stop 14 of the wheel. The dog then instead of dropping at once is allowed to gradually descend by the retarded action of the dash-pot, whereby the rate of operation of the controller-handle may be regulated to any desired extent. The movement of the piston in the cylinder may be regulated as stated. The controller may be returned to normal position without hindrance, for the dog 12 merely rises over the top of the teeth or projections on the periphery of the wheel. The strain upon the dog is taken up by the casting and does not bind the dash-pot piston, in the lower end of which the end of the lever 22 loosely rides.

In Fig. 4 I have shown the arrangement of the circuit for the magnet. The trolley 38 of the car engages the trolley-wire 39 and is connected through the controller 5 by conductor 40 with one terminal of the motor 41, the opposite terminal thereof being connected by conductor 42 with the ground through the wheels 43 of the car. One terminal of the magnet 32 is connected, through a resistance 45, with the trolley 38 by a branch conductor 46 and the opposite terminal of the magnet is connected by conductor 47 with the ground through the wheels 43. By this arrangement it will be seen that if for any reason the trolley-pole becomes disengaged from the wire, thereby breaking the circuit, the current through the magnet 32 is cut off and the same is deënergized, which releases the armature 35, and the dog 12, through the action of its spring, is moved out of the slot 10 and permits the controller to be rapidly moved in the on direction.

While I have shown and described one form of my apparatus, it will be understood that I do not wish to be limited to the details of construction, as there are numerous changes which may be made without departing from the spirit of my invention, the broad idea of which is to automatically release the retarding device of a controller-regulator when the operating-current is for any reason cut off, as set forth in the appended claims.

Having described my invention, what I claim as new, and desire to secure by Letters Patent, is—

1. The combination with a controller, of a device for retarding the movement thereof in the "on" direction, said device including means arranged to render it operative continuously while the operating-circuit is on, and means for rendering said device inoperative when the operating-circuit is broken to permit an unimpeded movement of the controller.

2. The combination with a controller-regulator, of electrically-controlled means for rendering said regulator operative continuously while the operating-current is turned on, means for rendering said regulator inoperative when the operating-current is cut off to permit an unimpeded movement of the controller.

3. The combination with a controller, of a device for retarding the movement thereof in the "on" direction when the motor-circuit is made, said device including means connected therewith which renders it operative independently of the strength of the current in the motor-circuit.

4. The combination with a controller, of a device for retarding the movement thereof in the "on" direction when the motor-circuit is made, said device including means connected therewith which renders it operative independently of the strength of the current in the motor-circuit, and means automatically rendering said device inoperative when the motor-circuit is broken.

5. In a controller-regulator, means controlled by a magnet for rendering said regulator operative continuously while the operating-circuit is made to permit an impeded movement of the controller in the "on" direction.

6. In a controller-regulator, means operated by a magnet connected in parallel with the motors for rendering said regulator operative continuously while the operating-circuit is made to permit an impeded movement of the controller in the "on" direction.

7. The combination with a controller, of a regulator therefor, means controlled by a magnet for rendering said regulator operative continuously while the operating-circuit is made to permit an impeded movement of the controller in the "on" direction, and means automatically rendering said regulator inoperative when the current to the motors is cut off.

8. The combination with a controller, of a regulator therefor, means operated by a magnet connected in parallel with the motors for rendering said regulator operative continuously while the operating-circuit is made to permit an impeded movement of the controller in the "on" direction, and means for automatically rendering said regulator inoperative when the current to the motors is cut off.

9. The combination with a controller, of a regulator therefor, means controlled by a magnet for rendering said regulator operative continuously while the operating-circuit is made to permit an impeded movement of the controller in the "on" direction, means automatically rendering said regulator inoperative when the current to the motors is cut off, and a suitable resistance for said magnet.

10. The combination with a controller, of means independent of the strength of current for retarding the movement of said controller, and means for automatically rendering said retarding means inoperative when the current is cut off.

11. The combination with a controller, of means independent of the current for retarding the movement of said controller and electrically-operated means for rendering said retarding means operative.

12. The combination with a controller, of means independent of the current for retarding the movement of said controller, and electrically-operated means for rendering said retarding means inoperative when the current is cut off.

13. The combination with a controller, of means independent of the current for retarding the movement thereof, electrically-operated means for maintaining said retarding means in operative position, and means for rendering said retarding means inoperative.

14. The combination with a controller, of means retarding the movement thereof, of electrically-operated means for maintaining said retarding means in operative relation continuously during the passage of current through the motor, and means for rendering said retarding means inoperative when current is cut off from the motor.

15. The combination with a controller, of mean for retarding the movement of said controller, a magnet for maintaining said retarding means in operative relation continuously while the operating-circuit is made; and means for rendering said retarding means inoperative when the operating-circuit is broken.

16. The combination with a controller, of means for retarding the movement thereof, a magnet for maintaining said retarding means in operative relation, a resistance for said magnet, and means for rendering said retarding means inoperative when said magnet is deënergized.

17. The combination with a controller, of regulating means to permit only an intermittent movement of said controller in one direction, but a continuous movement thereof in a reverse direction, and electrically-operated means for rendering said regulating means operative continuously while the operating-current is made.

18. The combination with a controller, of regulating means for permitting only an intermittent movement of said controller in one direction, and a continuous movement of said controller in a reverse direction, electrically-operated means for rendering said regulating means operative continuously while the current is on, and means for automatically rendering said regulating means inoperative when the current is cut off.

19. The combination with a controller, of regulating means to permit only an intermittent movement of the controller in one direction, and a continuous movement thereof in an opposite direction, of a magnet for maintaining said regulating means in operative relation continuously while the operative circuit is made, and means for rendering said regulating means inoperative when the said magnet is deënergized.

20. In a controller-regulator, the combination with operating means for said controller, of a series of stops, a movable dog, and a series of cams to move said dog into engagement with said stops, and electromagnetic means for rendering said dog inoperative.

In witness whereof I have hereunto subscribed my name in the presence of two witnesses.

JOSEPH V. E. TITUS.

Witnesses:
G. C. V. Cox,
C. A. LOEFFLER.